US009594368B2

(12) United States Patent
Kronenberg et al.

(10) Patent No.: US 9,594,368 B2
(45) Date of Patent: Mar. 14, 2017

(54) METHOD AND SYSTEM OF MANUFACTURING A GOLF CLUB, AND A MANUFACTURED GOLF CLUB HEAD

(71) Applicants: Marc Andrew Kronenberg, Hobe Sound, FL (US); Drew T. Deshiell, Oceanside, CA (US)

(72) Inventors: Marc Andrew Kronenberg, Hobe Sound, FL (US); Drew T. Deshiell, Oceanside, CA (US)

(73) Assignee: KRONE GOLF LIMITED, Hobe Sound, FL (US)

( * ) Notice: Subject to any disclaimer, the term of this patent is extended or adjusted under 35 U.S.C. 154(b) by 539 days.

(21) Appl. No.: 13/836,999

(22) Filed: Mar. 15, 2013

(65) Prior Publication Data

US 2014/0277671 A1 Sep. 18, 2014

(51) Int. Cl.
*G06F 19/00* (2011.01)
*G05B 19/4099* (2006.01)

(52) U.S. Cl.
CPC .......... *G05B 19/4099* (2013.01); *G05B 2219/49018* (2013.01)

(58) Field of Classification Search
CPC .............................. G05B 19/41885
USPC ..................................... 700/106
See application file for complete search history.

(56) References Cited

U.S. PATENT DOCUMENTS

| 6,089,070 A | 7/2000 | Hancock et al. |
| 7,775,906 B2* | 8/2010 | Kusumoto .................. 473/342 |
| 2004/0092332 A1* | 5/2004 | Willett et al. ................ 473/338 |
| 2004/0204257 A1* | 10/2004 | Boscha ............. A63B 24/0003 473/131 |
| 2006/0052181 A1 | 3/2006 | Serrano et al. |
| 2008/0235934 A1* | 10/2008 | Burnett .................. A63B 53/04 29/557 |
| 2009/0222206 A1* | 9/2009 | Burns et al. ...................... 702/1 |
| 2010/0298065 A1* | 11/2010 | Soracco et al. .............. 473/349 |
| 2012/0302379 A1* | 11/2012 | Margoles et al. ............ 473/407 |

OTHER PUBLICATIONS

International Search Report and Written Opinion mailed on Aug. 1, 2014, in corresponding International Application No. PCT/US2014/029397, 23 pages.

* cited by examiner

*Primary Examiner* — Kenneth M Lo
*Assistant Examiner* — Yuhui R Pan
(74) *Attorney, Agent, or Firm* — Procopio, Cory, Hargreaves & Savitch LLP; Noel C. Gillespie (57) ABSTRACT

A method of manufacturing a custom golf club, the method including measuring swing dynamics of a user, determine club design parameters based on the measure swing dynamics of the user, generating a computer model representing an custom golf club head based on the determined design parameters, and manufacturing the custom golf club head based on the generated computer model using additive layer manufacturing processes using powder material and a high energy beam.

35 Claims, 9 Drawing Sheets

METHOD AND SYSTEM OF MANUFACTURING A GOLF CLUB, AND A MANUFACTURED GOLF CLUB HEAD

BACKGROUND

Field of the Invention

The field of invention relates generally to the fitting of golf equipment and the manufacturing of golf equipment and more particularly to systems and methods designed to improve a golfer's swing and manufacture golf equipment customized to individual golfer's swing.

Related Art

A wide variety of methods have been used to form clubs have been used. Specifically, golf club heads have been forged or cast and then ground or machined, and then polished to achieve desired dimensions and appearances. However, these processes have a number of short comings.

Further, golf club heads have generally been manufactured with average dimensions based on an average user without any regard to the specific needs and swing dynamics of specific golfers. This was due to the expense and/or time required made customizing a head mold to incorporate design changes extremely impractical. Thus, to reduce cost and/or save time, a common mold has been used for the head design regardless of the swing dynamics of users. However, not all golfers are identical and many golfers may benefit from optimization of club design parameters such as lie angle, loft angle, or other design parameters. Through post-manufacturing processing, such as grinding or bending with a vice, may allow some custom fitting of clubs, these processes may have limited effectiveness and can create additional problems such as metal fatigue or weakening of the club.

Additionally, existing manufacturing techniques may also require additional post processing, such as grinding, due to manufacturing tolerances. Further, existing techniques have limitations in the shapes and dimensions that can be produced.

Therefore, there is a need for golf club heads that can be more customized based on a specific user's swing dynamics, as well as manufacturing methods that can produce a wider variety of shapes with tighter manufacturing tolerances.

SUMMARY

A general purpose of present application is a method of manufacturing a golf club head that can customize more club design parameters to a specific user's swing dynamics. Various embodiments of the present application may provide a method of manufacturing a golf club head by measuring a user's swing dynamics, determining club design parameters based on measured swing dynamics, generating a computer model of a club head based on the determined design parameters, and using the computer model to manufacture the golf club head using additive layer manufacturing processes using powder material and a high energy beam.

An additional embodiment of the present application may also provide a described herein may also include a system for manufacturing a golf club, the system including a launch monitor that measures a user's swing dynamics of a user, an club design parameter determining engine that determines club design parameters based on the measured swing dynamics of the user, a computer modeler that generates a computer model representing a custom golf club head based on the determined design parameters; and an additive layer manufacturing device that manufactures the custom golf club head based on the generated computer model using additive layer manufacturing processes using powder material and a high energy beam.

An additional embodiment of the present application may also provide a method of manufacturing a custom golf club by measuring swing dynamics of a user, determine club design parameters based on the measure swing dynamics of the user, generating a computer model representing a portion of a custom golf club head based on the determined design parameters, manufacturing the portion of the custom golf club head based on the generated computer model using additive layer manufacturing processes using powder material and a high energy beam, and attaching the portion of the custom golf club head to a preformed partial club head to assemble the custom golf club head.

Other features and advantages of the present application may become more readily apparent to those of ordinary skill in the art after reviewing the following detailed description and accompanying drawings.

BRIEF DESCRIPTION OF THE DRAWINGS

The structure and operation of the present invention will be understood from a review of the following detailed description and the accompanying drawings in which like reference numerals refer to like parts and in which.

DETAILED DESCRIPTION

Certain embodiments disclosed herein provide for a method of manufacturing a golf club head. However, although various embodiments of the present invention will be described herein, it is understood that these embodiments are presented by way of example only, and not limitation. As such, this detailed description of various alternative embodiments should not be construed to limit the scope or breadth of the present invention as set forth in the appended claims.

Figure 1:
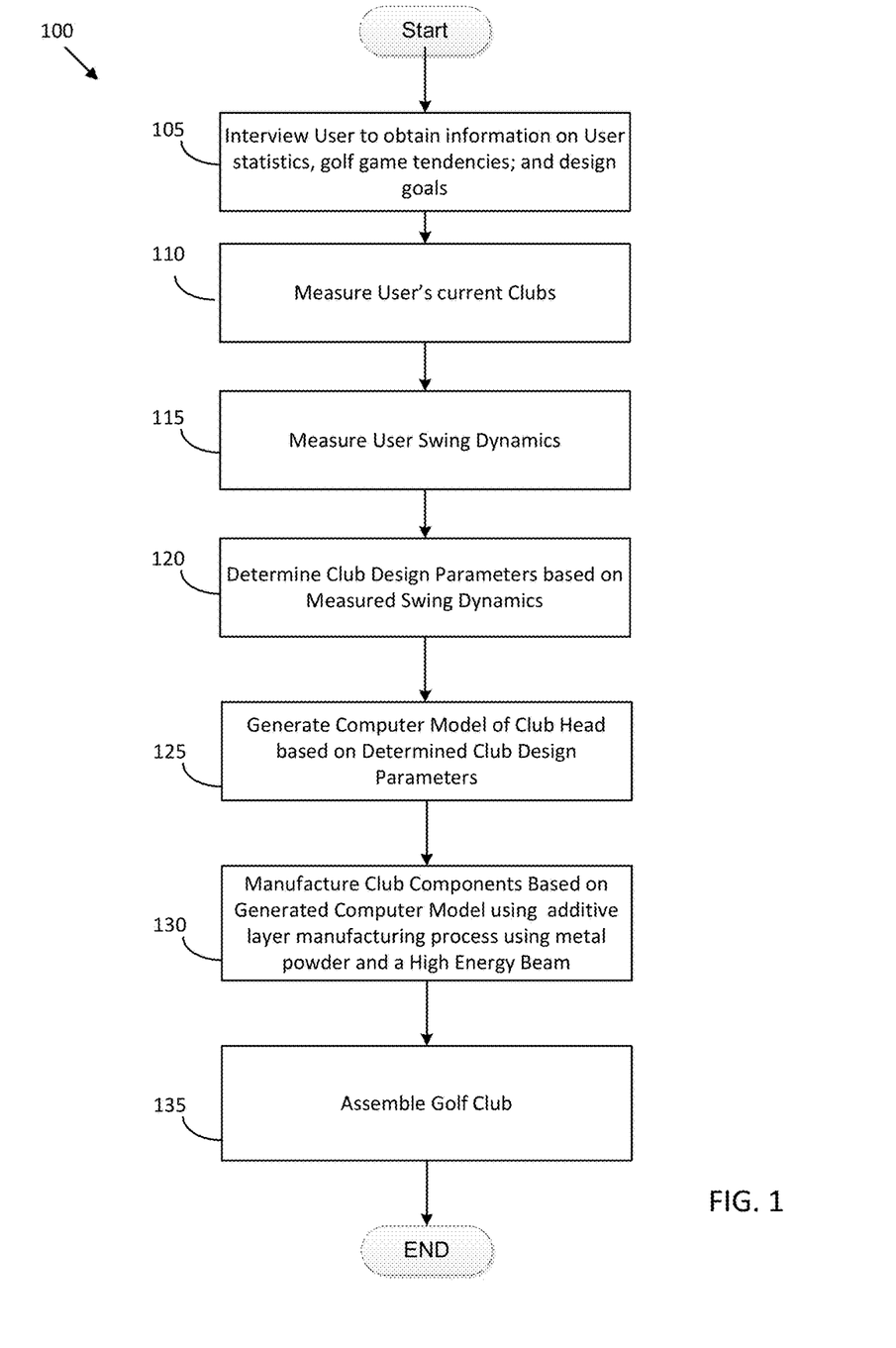
FIG. 1 is illustrates a flow chart showing a manufacturing process of a custom golf club according to an embodiment of the present application.

FIG. 1 provides a flow chart showing a manufacturing process 100 for a custom golf club according to an embodiment of the present application. In action 105, the user is interviewed to provide initial background information to be used to design the custom golf club. Specifically, a user may be asked to fill out a questionnaire regarding the User's playing statistics. The User's statistics may include, but are not limited to height, weight, years of playing golf, handicap, putts per round, and #rounds per year. Additionally, the user may also be asked about the current golf tendencies including: trajectory of shots, swing path (i.e. hook, slice, etc.) and consistency of shots. Further, the user's goals regarding distance, ball trajectory, drawing, fading the ball, etc.

After the user interview in action 105, the user's current clubs may be measured in action 110 to obtain current club design parameters that may be effecting the User's golf shots. In particular, a variety of current club design parameters may be measured including loft, lie, face angle, hosel offset, club length, club weight, club swing weight, shaft weight, shaft flex, grip size, grip weight, and any other parameters as would be apparent to a person of ordinary skill in the art.

After the design parameters of the user's current clubs are measured in action 105, the user's swing dynamics are analyzed in action 115. Specifically, a user's swing dynamics or Launch parameters with several clubs may be measured with a launch monitor (such as trackman, foresight, etc.). Using the launch monitor, a variety of swing dynamics or launch parameters are measured including: head speed, launch angle, backspin, attack angle, ball speed, swing plane angles, club path, spin axis, horizontal launch angle, tempo, and any other parameters as would be apparent to a person of ordinary skill in the art.

After swing dynamics or launch parameters are measured in action 115, design parameters for the custom clubs are determined in action 120 through a fitting process. Specifically, initial fitting clubs determined based on the user's height, swing path, and launch conditions. Then final head and club specifications are determined by fitting for:

Consistency by adjusting or optimizing club length and lie by dynamic fitting;
Distance by adjusting club loft to optimize spin and clubhead speed by dynamic fitting;
Control by adjusting face angle to optimize side spin by dynamic fitting; and
Playability by adjusting shaft, grip, total weight and swing weight for best feel.

From this fitting, club design parameters for the head and final club components are determined. Head design specifications are then determined from the fitting process to specify the optimal head design and properties. Thus, the club specifications are determined at least in part from the results of the dynamic fitting process.

After the design parameters are determined in action 120, a computer model of the club head is generated in action 125. Thus, rather than modifying (i.e. by bending, adjusting weight) of existing parts, a club head computer model is designed based on the determined design parameters. In some embodiments, the club head id generated by first by selecting a base model (Driver, Fairway Wood, Hybrid, Iron, Wedge, Putter, etc.) from a library of club head models. Then, club design parameters such as volume, loft, lie, face angle, weight, CG properties, inertial properties, shape, offset are entered into the base model which is then updated based on the user's required specifications. Additionally, in some embodiments, the face thickness and face thickness geometry (i.e. back face geometry discussed in greater detail below) may be adjusted based on the user's head speed and control tendencies. The customized model can be encoded as a CAD file that will be used to manufacture parts.

After the computer model is generated in action 125, the club head can be manufactured using additive layer manufacturing techniques that use powdered metal and high energy beams (such as a laser or electron beam) in action 130.

Electron Beam Apparatus

Figure 2A:
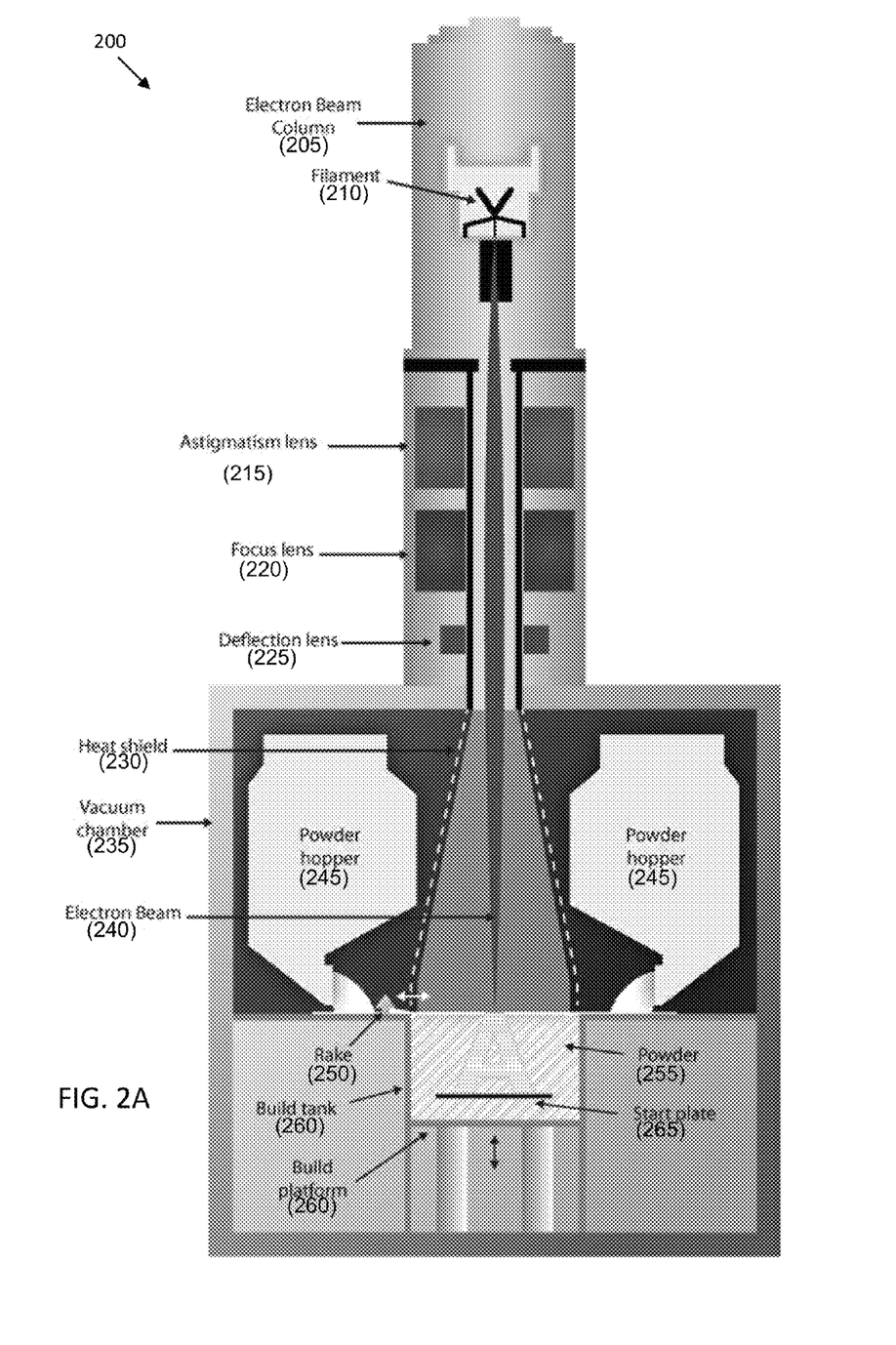
FIG. 2A is a diagram illustrating an additive layer manufacturing apparatus using an electron beam, which may be used in a method according to an embodiment of the present application.

FIG. 2A is a diagram illustrating an additive layer manufacturing apparatus using an electron beam, which may be used in a method according to an embodiment of the present application. The manufacturing apparatus 200 includes an electron beam column 205 that generates an electron beam 240 by applying a voltage to a filament 210. The generated electron beam 240 passes through a plurality of lenses 215, 220, and 225 before entering the vacuum chamber 235 where the club head is manufactured. The vacuum chamber 235 includes at least one powder hopper 245 filled with powdered material 255 that will be melted to form the club head.

The powdered materials used can be a wide variety of materials and including most metals including titanium (Ti), Steel, Aluminum (Al), Titanium aluminum alloys (Titanium Aluminide or TiAl), which generally cannot be cast or welded. More specifically, example materials include, but are not limited to:

Aluminum Alloys~2.86 g/cc—such as AlSi10Mg, AlSi12;
Steel Alloys~7.8 g/cc—such as Stainless Steel, Hot Worked Steel (stainless and non stainless);
Titanium~4.5 g/cc—Pure Ti, TiAl6V4, TiAl6V4 ELI;
Silver~10.3 g/cc;
Gold~19.3 g/cc;
Tungsten~19.2 g/cc;
Platinum~21.4 g/cc;
Nickel Based Alloys such as Inconel;
Cobalt-Chrome Alloys such as CoCr;
Bronze; and
TiAl~3.8~4.0 g/cc (titanium Aluminide).

The manufacturing apparatus 200 may also include a heat shield 230 between the electron beam 240 and the powder hopper(s) 245 to prevent melting of the powdered materials 255 prior to being moved into the build tank 260. A rake 250 is provided to move powdered material 255 into the build tank 250 as needed during the manufacturing.

The electron beam 240 is moved across the surface of the powdered material 255 in the build tank 260 based on the computer model to form the club head on a layer by layer basis. As each layer is formed, the club head rests on the start plate 265 and build platform 260. As the club head is formed, the start plate 265 and a build platform 260 are moved downward to provide space form successive layers and additional powdered material 255.

Though an electron beam 240 is used by the apparatus 200 shown in FIG. 2A, the present application is not limited to electron beam based technologies and may include any additive layer manufacturing method that uses powdered material and high-energy beams (such as an electron beam or a laser).

Laser Beam Apparatus

Figure 2B:
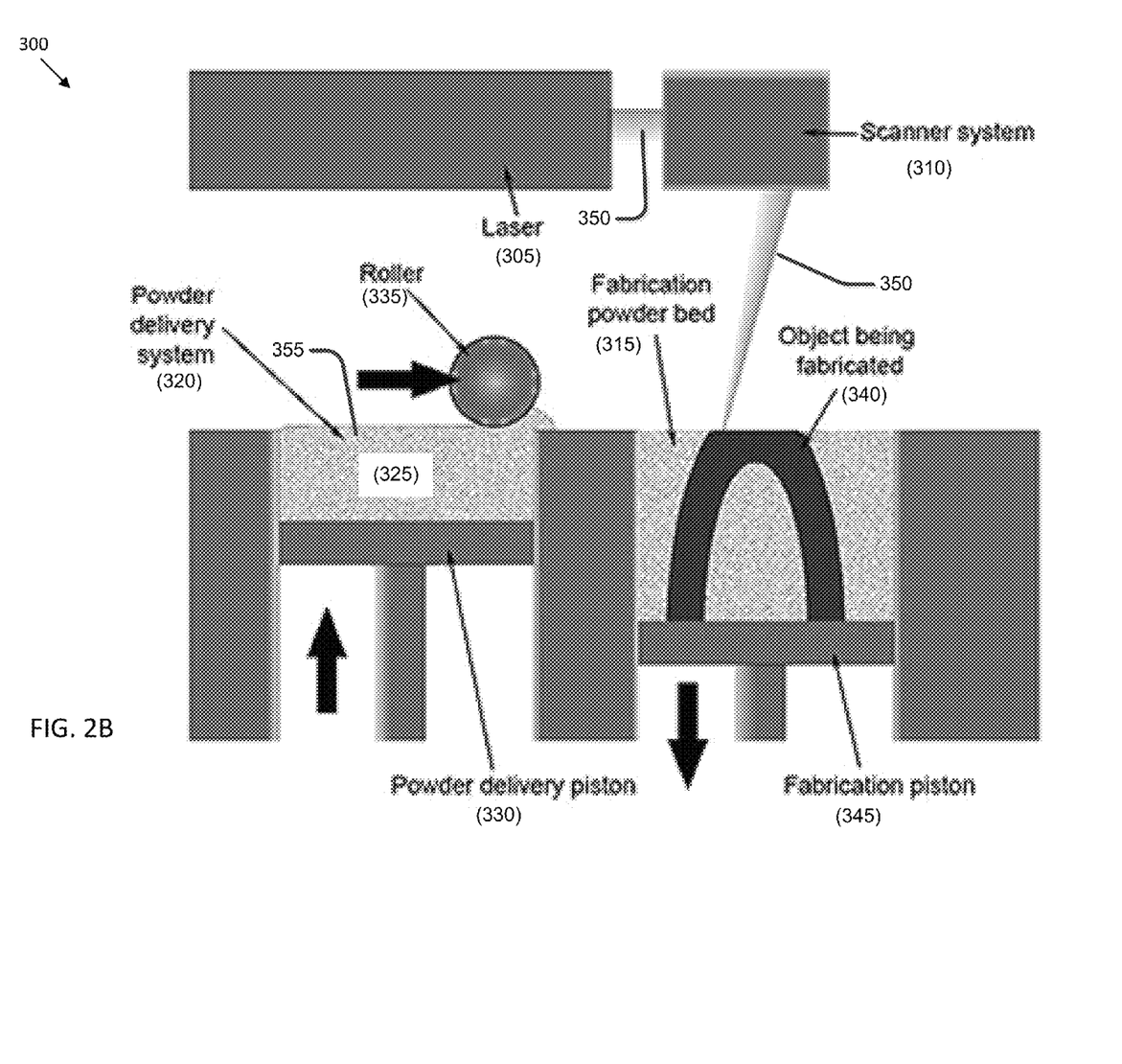
FIG. 2B is a diagram illustrating an additive layer manufacturing apparatus using a laser beam, which may be used in a method according to an embodiment of the present application.

Additionally, FIG. 2B is a diagram illustrating an additive layer manufacturing apparatus 300 using a laser beam, which may be used in a method according to an embodiment of the present application. The additive layer manufacturing apparatus 300 using a laser beam works in a similar manner to the apparatus 200 discussed above. Specifically, the manufacturing apparatus 300 includes an laser 305 that generates a laser beam 350. The generated laser beam 350 is directed at a scanner system 310 that redirects and controls the laser beam 350 to scan the laser beam 350 across the surface of a fabrication bed 315 filled with powdered material 325. Further, adjacent to the fabrication powder bed 315, a powder delivery system 320 is provided to add additional powder material 325 to the fabrication bed 315 as needed. The powder deliver system 320 includes a powder tank 355 filled with powdered material 325, a powder deliver piston 330 that moves upward to push powdered material 325 upward and a roller 335 that directs powdered material to the fabrication powder bed 315.

The scanner system 310 controls the laser beam 350 to move the laser across the surface of the fabrication bed 315 based on the computer model to form the object being fabricated 340, layer by layer. As successive layers of the object 340 are formed, a fabrication piston 345 is retracted downward to gradually lower the object 340 and allow powdered material 325 to flow over the top of the object 340 so that successive layers can be formed.

As with the electron beam apparatus 200 discussed above, a wide variety of powdered materials can be used in the laser beam additive layer manufacturing apparatus 300, including most metals including titanium (Ti), Steel, Aluminum (Al), Titanium aluminum alloys (Titanium Aluminide or TiAl), which generally cannot be cast or welded. Thus, the example materials include the same materials discussed above with respect to the electron beam apparatus 200

Example Structures

These additive layer manufacturing techniques allow manufacturing of surface features having a minimum thickness of Surfaces equal to 300 microns (um). Further, structures of mesh or lattice structures such as those shown in FIGS. 3, 4, 8 and 9 discussed below may have a minimum thickness equal to 150 microns (um).

In some embodiments, the golf head may be manufactured to have a one piece (or unibody) construction, with the face and body (crown, skirt, sole) being formed as a one-piece golf head having hollow or partially hollow sections without a need to weld components together. In some embodiments, a small exit hole may be used to remove powder trapped within hollow areas of the head, but the exit hole can be drilled after the head is manufactured.

Using the additive layer manufacturing techniques, any type of golf club head could be theoretically manufactured based on a generated computer model without a need to retool, producing a variety of clubs faster than methods previously used, such as casting, stamping or forging. Additionally, in some embodiments, using additive layer manufacturing techniques may allow a reduction in waste material because 95~98% of powder can be reclaimed and used to make more parts. Conversely, forging and casting processes typically produce significant amounts of waste materials.

Additionally, additive layer manufacturing techniques may not require welding of multiple pieces together because clubs can have unibody construction to form a one-piece golf head having a hollow and/or non-hollow sections with no welds. Further, as would be apparent to a person of ordinary skill in the art, if welding is not required, the occurrence of heat affected zones that degrade material properties may be reduced.

The additive layer manufacturing process eliminates thickness and weight variations often caused by grinding to remove material, thermal expansions and shrinkage caused by the lost wax casting process, and inconsistencies and tool wear with conventional tooling processes.

As the additive layer manufacturing processes do not require grinding, which may cause varying thickness or weak spots, tooling, or welding, which may cause thermal expansion or shrinkage, tighter tolerances can be held. These tighter tolerances may also be a reduced need to "re-work" or "repair" out of spec. parts, which can produce a cost savings.

Further, additive layer manufacturing processes may not suffer Flow constraints that casting may experience. Further, additive layer manufacturing processes have higher porosity compared to casting (99.5% dense) and may produce more durable part with thinner structures Further, additive layer manufacturing techniques may allow the manufacturing of complex geometries not achievable with casting, machining, or forging techniques typically used. FIGS. 3-9 illustrate a sampling of the structures that can be manufactured using additive layer manufacturing techniques.

Figure 3:
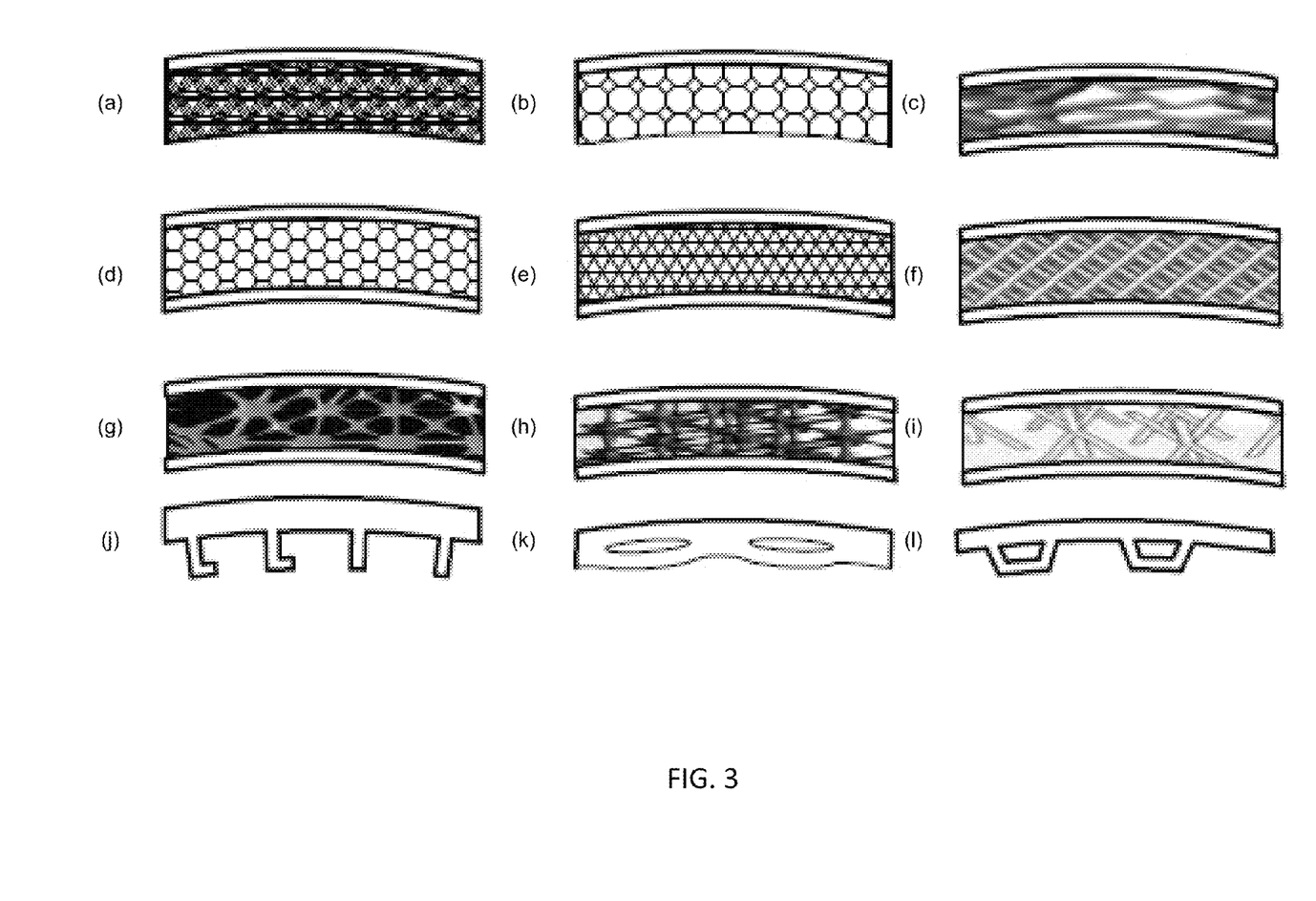
FIG. 3 is a sectional diagram illustrating a plurality of portions of a club that can be manufactured using a method according to an embodiment of the present application.

For example, internal 3D geometries that can not otherwise be manufactured, such as those shown in embodiments (a)-(i) of FIG. 3, may be manufactured. Further, undercuts such as those shown in embodiment (j) of FIG. 3 may be formed without the need for special tooling. Further, separate pockets and slots, typically too difficult to cast or machine, such as those shown in embodiments (k) and (l), can be manufactured using additive layer manufacturing techniques. Thus, iron bodies/soles can be made with undercuts/complex geometries can be manufactured.

Figure 4:
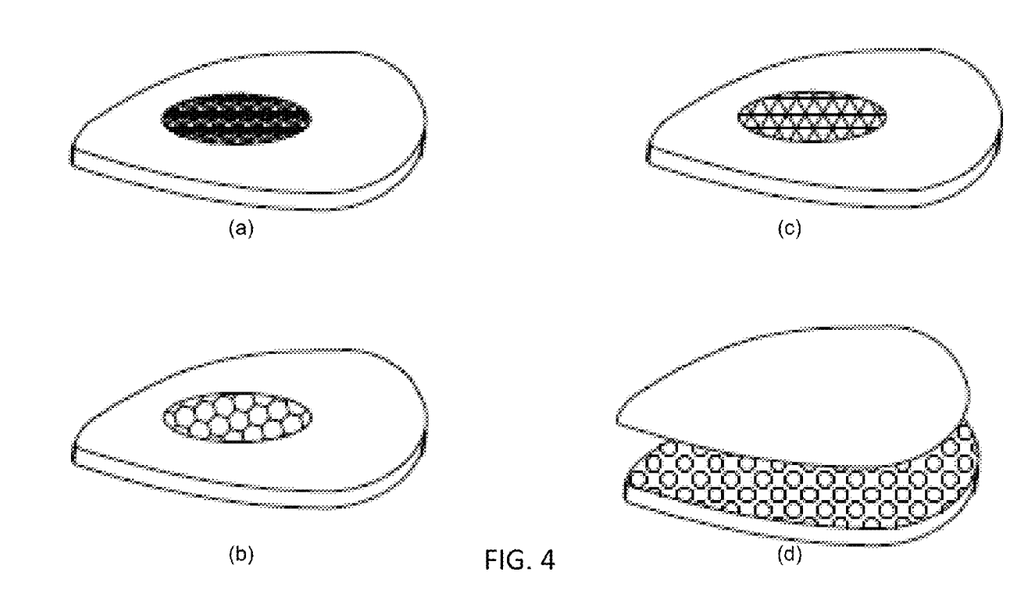
FIG. 4 is a perspective view illustrating a core of a sandwich or lattice structure that can be manufactured using a method according to an embodiment of the present application.

Further, 3D lattice/core geometries having a thin skin of metal on either side (1 side), both sides (sandwich), or without a skin on either side (open core), such as those shown in FIG. 4 may also be manufactured. Also, a thin non-metallic skin can also be bonded or joined to the core. These 3D lattice/core geometries are discussed in more detail with respect to FIGS. 8 and 9 below.

Figure 6:
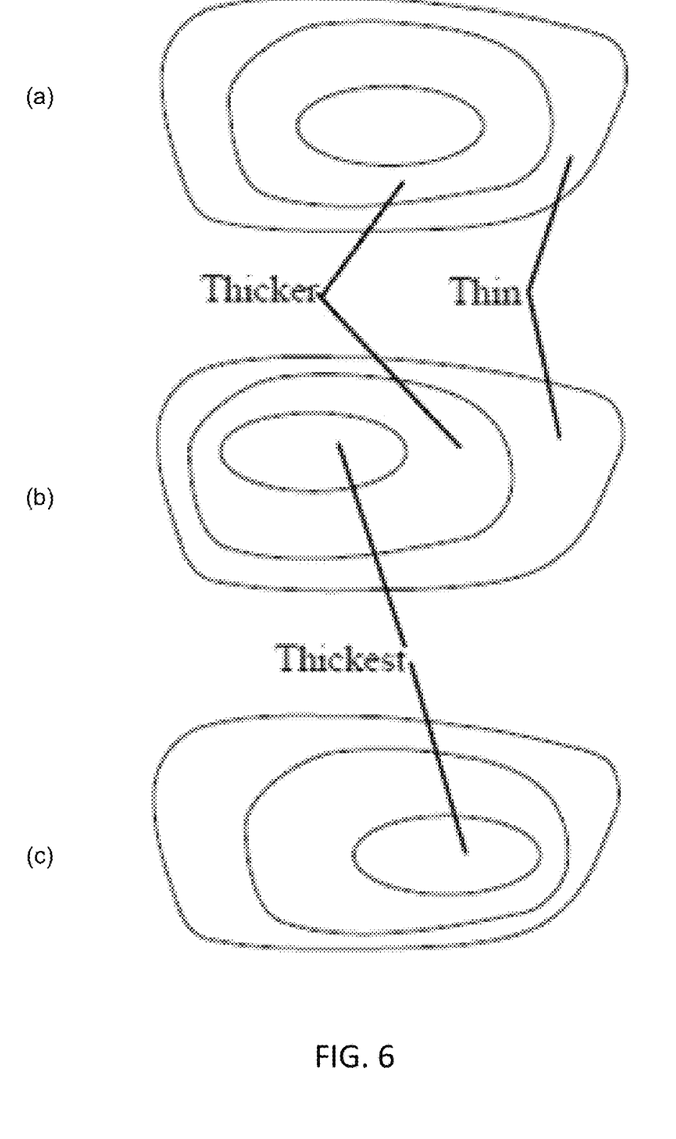
FIG. 6 is a back or internal view illustrating a plurality of club faces manufactured using a method according to an embodiment of the present application.
Figure 7:
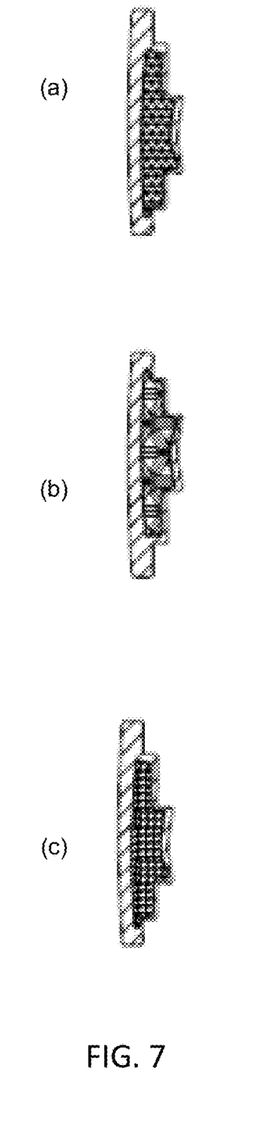
FIG. 7 is a sectional view illustrating the plurality of club faces shown in FIG. 6 manufactured using a method according to an embodiment of the present applications.

Additionally, face inserts have complex variations in face thickness and face geometry, such as those shown in FIGS. 6 and 7 may be manufactured. Specifically, as shown in FIGS. 6 and 7, face inserts having multiple regions of different discrete thicknesses can be manufactured with the thickest regions being located at different portions of the club face depending on design needs. Further, face plates may have complex interior geometries having lightweight cores or lattice structures between skins as shown in FIG. 7 may be manufactured. Since no welding/grinding is necessary, a minimum thickness necessary to have a maximum Coefficient of Restitution can be manufactured, and the inserts still having sufficient durability.

Further, these face inserts can be manufactured to be have complex internal geometries using additive layer manufacturing techniques and then welded to bodies formed using conventional methods such as casting, stamping, or forging. These face inserts can be custom made for based on the player's striking tendencies (i.e. to have max thickness where the player consistently impacts striking face and with thicknesses reducing to maximize the Coefficient of Restitution.

Figure 5:
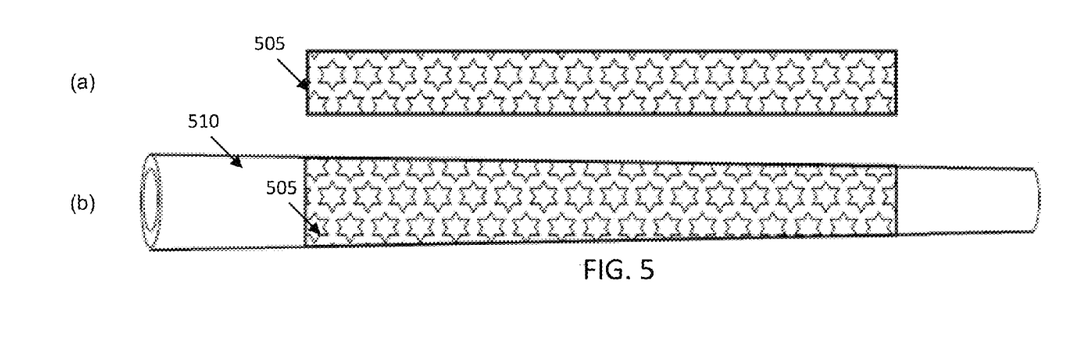
FIG. 5 is a perspective view illustrating thin-film metal structure that can be manufactured according to an embodiment of the present application and applied to a club shaft.

Further, the additive layer manufacturing techniques is not limited to manufacturing the club head and may also be used to manufacture thin metal foils. These thin metal foils may be manufactured and wrapped around on a composite or metal shaft substrate to change or customize the performance characteristics and/or add cosmetic effects to a golf shaft. FIG. 5a shows an example embodiment of a thin-metal foil 505 and FIG. 5a shows the thin-metal foil 505 wrapped around a shaft 510. Alternative, a Lightweight lattice structure can be inserted into the hollow inner diameter of the shaft to change the stiffness/performance of the shaft.

As discussed above, complex 3D geometries or 3D lattices can be manufactured as a weight efficient support structure or as a lightweight supporting core for thin walls.

Figure 8:
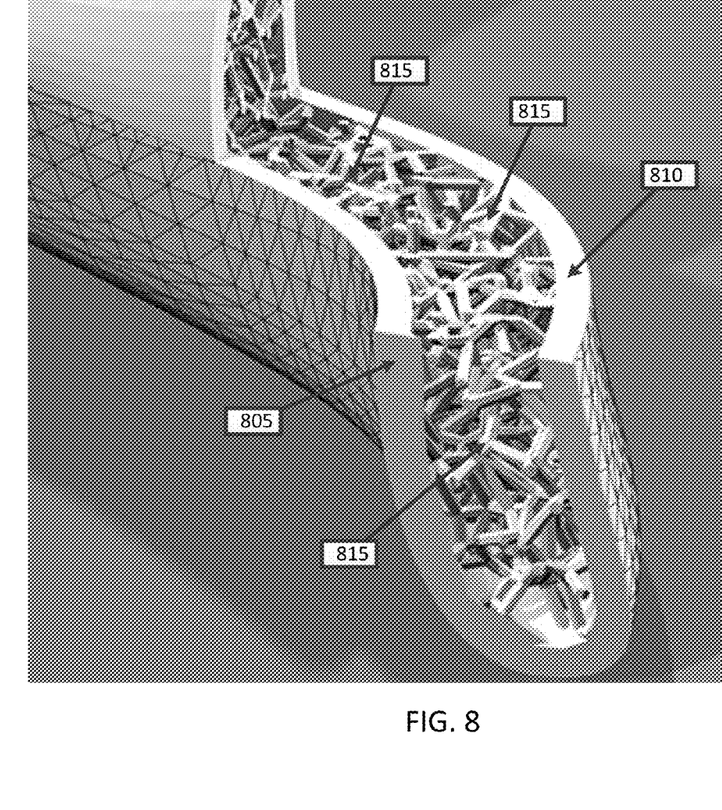
FIG. 8 illustrates a hollow structure that can be manufactured using a method according to an embodiment of the present application.
Figure 9:
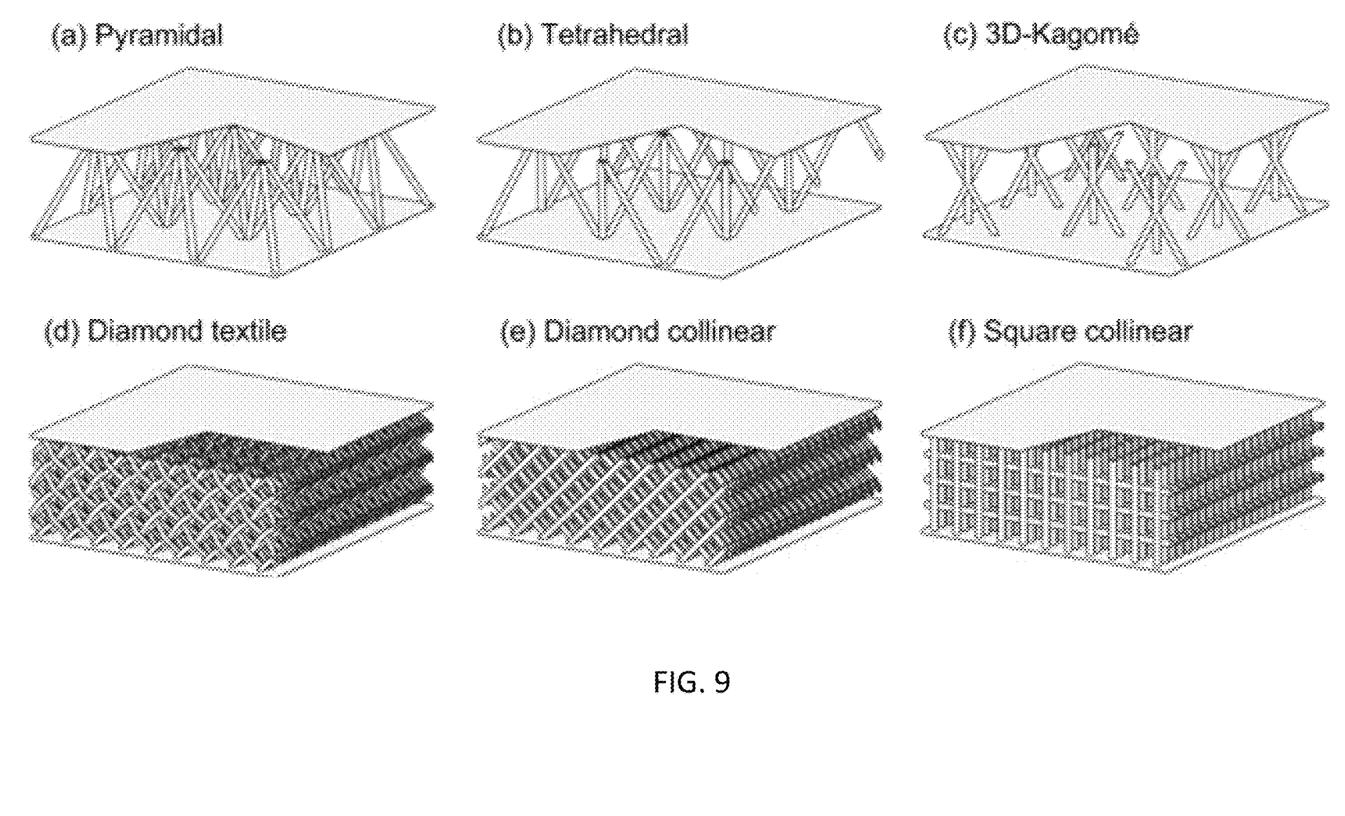
FIG. 9 illustrates a plurality of additional types of supporting lattice structures that can be manufactured using a method according to an embodiment of the present application.

FIG. 8 illustrates an enlarged view of an embodiment having thin walls 805, 810 with a plurality of supporting lattices 815 formed between the thin walls 805, 810. Further, FIG. 9 illustrates a plurality of types of 3D lattice structures that can be manufactured using additive layer manufacturing techniques. These include pyramidal lattices (a), tetrahedral lattices (b), 3D-Kagome lattices (c), diamond textile lattices (d), diamond collinear lattices (e), and A square collinear lattices (f). These structural shapes may to increase strength/ stiffness, lower weight, and change or optimize the "feel" of the club. The lattice geometries shown in the present application are merely examples and embodiments of the present application are not limited to these shapes. Further, the lattice geometries may also include a 3D mesh designed and optimized to provide the head characteristics desired based on the user's needs.

These "lattice" geometries manufactured using additive layer manufacturing techniques can be applied to any part of a golf club head, including the sole, crown, skirt, etc. and is not particularly limited to only the hitting face. These lattices can also provide an internal support structure to join two sections (for example can be a bridge between the crown and the sole to provide stiffness). Further, the lattice geometries can be manufactured separately or integrated into 1 piece heads.

Additive layer manufacturing can also allow the development of any other details or shapes that have previously been too fine to be cast or machined, such as springs and teeth of a snap clip allowing components (weights) to be attached to an exterior of a club head. The embodiments shown and discussed above are not intended to be limited and are merely provided as examples.

Additionally, as additive layer manufactured golf club components require minimal post manufacturing finishing, that may reduce manufacturing cost or time. Further, additive layer manufacturing discussed above can also allow the "printing" of a surface finish or engineered texture on the face or any exterior surface to influence spin, aerodynamics, or acoustics (sound).

After the heads and other club components are manufactured and finished in action 130 of the FIG. 1, the heads are assembled to the required shafts and grips to achieve the club specifications (length, weight, flex, etc.) determined as optimal during the fitting process in action 135. Thus, a final golf club is supplied that is made specifically for the individual golfer based on his unique player characteristics, and his unique requirements to give optimal performance. The properties and parameters of the head components are determined and manufactured to be customized to the individual to a much greater extent that was previous available.

Example Computing Device And Environment

Figure 10:
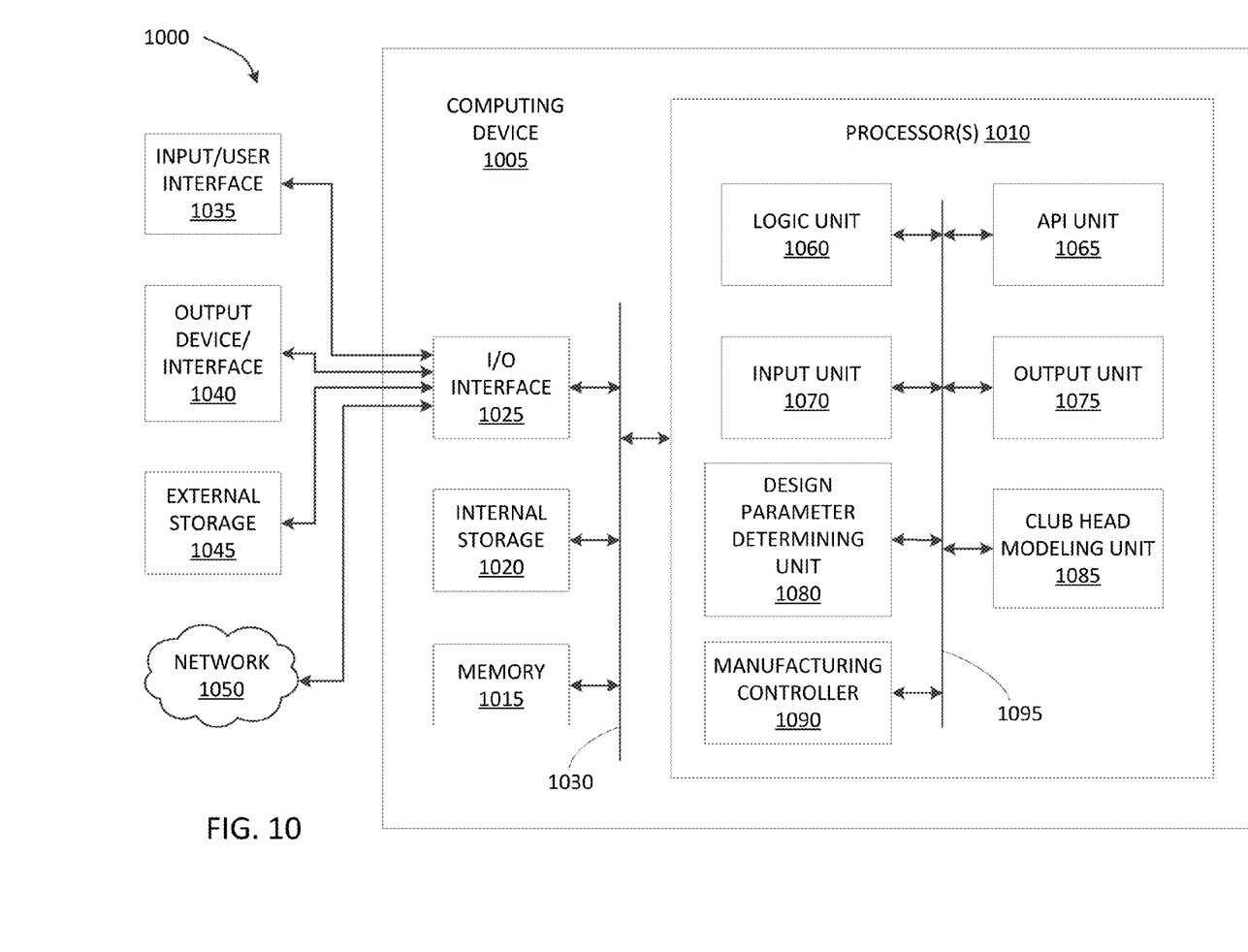
FIG. 10 is a diagram illustrating an example computing environment with an example computing device that could be used to perform a method according to an example implementation of the present application.

FIG. 10 shows an example computing environment with an example computing device suitable for implementing at least one example implementation. Computing device 1005 in computing environment 1000 can include one or more processing units, cores, or processors 1010, memory 1015 (e.g., RAM or ROM), internal storage 1020 (e.g., magnetic, optical, or solid state storage), and I/O interface 1025, all of which can be coupled on a communication mechanism or bus 1030 for communicating information.

Computing device 1005 can be communicatively coupled to input/user interface 1035 and output device/interface 1040. Either one or both of input/user interface 1035 and output device/interface 1040 can be a wired or wireless interface and can be detachable. Input/user interface 1035 may include any device, component, sensor, or interface, physical or virtual that can be used to provide input (e.g., keyboard, a pointing/cursor control, microphone, camera, braille, motion sensor, optical reader, or the like). Output device/interface 1040 may include a display, monitor, printer, speaker, braille, or the like. In some example implementations, input/user interface 1035 and output device/ interface 1040 can be embedded with or physically coupled to computing device 1005 (e.g., a mobile computing device with buttons or touch-screen input/user interface and an output or printing display, or a television).

Computing device 1005 can be communicatively coupled to external storage 1045 and network 1050 for communicating with any number of networked components, devices, and systems, including one or more computing devices of the same or different configuration. Computing device 1005 or any connected computing device can be functioning as, providing services of, or referred to as a server, client, thin server, general machine, special-purpose machine, or by other labels.

I/O interface 1025 can include, but is not limited to, wired and/or wireless interfaces using any communication or I/O protocols or standards (e.g., Ethernet, 802.11x, Universal System Bus, WiMax, modem, a cellular network protocol, and the like) for communicating information to and/or from at least all the connected components, devices, and networks in computing environment 1000. Network 1050 can be any network or combination of networks (e.g., the Internet, local area network, wide area network, a telephonic network, a cellular network, satellite network, and the like).

Computing device 1005 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computing device 1005 can be used to implement techniques, methods, applications, processes, or computer-executable instructions to implement at least one implementation (e.g., a described implementation). Computer-executable instructions can be retrieved from transitory media, and stored on and retrieved from non-transitory media. The executable instructions can be originated from one or more of any programming, scripting, and machine languages (e.g., C, C++, C#, Java, Visual Basic, Python, Perl, JavaScript, and others).

Processor(s) 1010 can execute under any operating system (OS) (not shown), in a native or virtual environment. To implement a described implementation, one or more applications can be deployed that include logic unit 1060, application programming interface (API) unit 1065, input unit 1070, output unit 1075, design parameter determining unit 1080, club head modeling unit 1085, manufacturing controller 1090, and inter-unit communication mechanism 1095 for the different units to communicate with each other, with the OS, and with other applications (not shown). For example, design parameter determining unit 1080, club head modeling unit 1085, action unit 1090, along with one or more other units, may implement one or more processes shown in FIG. 1. In some example implementations, design parameter determining unit 1080 may include two or more separate units. The described units and elements can be varied in design, function, configuration, or implementation and are not limited to the descriptions provided.

In some example implementations, when information or an execution instruction is received by API unit 1065, it may be communicated to one or more other units (e.g., logic unit 1060, input unit 1070, output unit 1075, design parameter determining unit 1080, club head modeling unit 1085, manufacturing controller 1090). For example, club head modeling unit 1085 may generate a computer model of a club head based on design parameters determined by the design parameter determining unit 1080 based on received user's swing dynamics.

The design parameter determining unit 1080 may use the inter-unit communication mechanism 1095 to receive a user's swing dynamics input via the input unit 1070. Further, the design parameter determining unit 1080 may determine club design parameters based on the input user swing dynamics and may communicate the club design parameters to the club head modeling unit 1085. The club head modeling unit 1085 may generate computer model of a golf club head based on the determined club design parameters and communicate the computer model to the manufacturing controller 1090. The manufacturing controller 1090 may use the generated model to control additive layer manufacturing equipment to manufacture a golf club head based on the received model.

In some examples, logic unit 1060 may be configured to control the information flow among the units and direct the services provided by API unit 1065, input unit 1070, output unit 1075, the design parameter determining unit 1080, club head modeling unit 1085, manufacturing controller 1090 in order to implement an implementation described above. For example, the flow of one or more processes or implementations may be controlled by logic unit 1060 alone or in conjunction with API unit 1065.

Although a few example implementations have been shown and described, these example implementations are provided to convey the subject matter described herein to people who are familiar with this field. It should be understood that the subject matter described herein may be embodied in various forms without being limited to the described example implementations. The subject matter described herein can be practiced without those specifically defined or described matters or with other or different elements or matters not described. It will be appreciated by those familiar with this field that changes may be made in these example implementations without departing from the subject matter described herein as defined in the appended claims and their equivalents.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

The invention claimed is:

1. A method of manufacturing a custom golf club, the method comprising:
   measuring, using a launch monitor, dynamic launch aspects of a golf swing, and flight characteristics imparted to a golf ball thereby, of a user when the user swings a regular golf club;
   determining club design parameters based on the measured dynamic launch aspects and flight characteristics as a result of the user's golf swing;
   generating a computer model representing a custom golf club head based on the determined design parameters, wherein the generating the computer model comprises generating an at least partial hollow golf club head having an supporting lattice based on the determined design parameters; and
   manufacturing the custom golf club head based on the generated computer model using additive layer manufacturing processes using powder material and a high energy beam to form the supporting lattice as one piece concurrently with forming an external surface of the at least partial hollow golf club head around the supporting lattice.

2. The method of claim 1, wherein the measured dynamic aspects of a golf swing include one or more of: golf club head swing speed, golf ball launch spin rate, golf ball launch angle, backspin, attack angle, ball speed, swing plane angles, club path, spin axis, horizontal launch angle, tempo, dynamic loft, droop of the club shaft, lead of the club shaft, lag of the club shaft, and face angle.

3. The method of claim 1, wherein the determining golf club design parameters comprises determining at least one of:
   Hosel offset;
   Club head volume;
   Club face height;
   Club face length;
   Placement of visual alignment aids;
   Club head Sole curvature;
   Club head sole bounce; and
   Club head sole grid.

4. The method of claim 1, wherein the determining golf club design parameters comprises adjusting at least one of:
   Club head face thickness;
   Club head face (hitting surface) center of gravity; and
   Club head face thickness geometry.

5. The method of claim 1, wherein the determining golf club design parameters comprises adjusting at least one of:
   Golf Club Head weight; and
   Placement of center of gravity.

6. The method of claim 1, wherein the generating a computer model comprises:
   Selecting a base model of a golf club head from a plurality of predefine club head models;
   Modifying the base model based on the determined club design parameters determined based on the measured dynamic aspects of a golf swing.

7. The method of claim 6, wherein the base model comprises at a model of at least one of a driver model; fairway wood model; hybrid model; iron model; wedge model; and putter model.

8. The method of claim 6, wherein the modifying the base model comprises changing at least one of:
- Hosel offset;
- Club head volume;
- Club face height;
- Club face length;
- Placement of visual alignment aids;
- Club head Sole curvature;
- Club head sole bounce; and
- Club head sole grid of the base model.

9. The method of claim 1, wherein the manufactured ideal golf club head comprises a metal unibody golf club head having no welds and at least a partially hollow section or area.

10. The method of claim 9, wherein the manufactured ideal golf club head comprises hollow golf club head.

11. The method of claim 1, wherein the manufactured ideal golf club head comprises a hollow golf club head having a supporting lattice formed within the hollow golf club head.

12. The method of claim 1, wherein the manufactured golf club head comprises a hollow portion having at least one internal rib formed therein.

13. The method of claim 1, wherein the manufactured golf club head comprises an engineered texture or design formed in at least one surface thereof.

14. The method of claim 1, wherein the manufactured golf club head comprises at least one attachment feature.

15. The method of claim 14, wherein the at least one attachment feature is selected from at least one of:
- a clip;
- a snap;
- a pocket;
- a threaded surface; and
- a slot.

16. A system for manufacturing a custom golf club, the system comprising:
- a launch monitor configured to measure dynamic launch aspects of a golf swing, and flight characteristics imparted to a golf ball thereby, of a user when the user swings a regular golf club;
- a club design parameter determining engine configured to determine club design parameters based on the measured dynamic launch aspects and flight characteristics as a result of a golf swing of the user;
- a computer modeler configured to generate a computer model representing a custom golf club head based on the determined design parameters, wherein the computer modeler is configured to generate a computer model comprising an at least partial hollow golf club head having an supporting lattice based on the determined design parameters; and
- an additive layer manufacturing device configured to manufacture the custom golf club head based on the generated computer model using additive layer manufacturing processes using powder material and a high energy beam to form the supporting lattice as one piece concurrently with forming an external surface of the at least partial hollow golf club head around the supporting lattice.

17. The system of claim 16, wherein the launch monitor is configured to measure one or more of: golf club head swing speed, golf ball launch spin rate, golf ball launch angle, backspin, attack angle, ball speed, swing plane angles, club path, spin axis, horizontal launch angle, tempo, dynamic loft, droop of the club shaft, lead of the club shaft, lag of the club shaft, and face angle.

18. The system of claim 16, wherein the club design parameter determining engine is configured to determine at least one of:
- Hosel offset;
- Club head volume;
- Club face height;
- Club face length;
- Placement of visual alignment aids;
- Club head Sole curvature;
- Club head sole bounce; and
- Club head sole grid.

19. The system of claim 16, wherein the club design parameter determining engine is to adjust at least one of:
- Club head face thickness;
- Club head face (hitting surface) center of gravity; and
- Club head face thickness geometry.

20. The system of claim 16, wherein the club design parameter determining engine is to adjust at least one of:
- Golf Club Head weight; and
- Placement of center of gravity.

21. The system of claim 16, wherein the computer modeler is configured to:
- Select a base model of a golf club head from a plurality of predefine club head models;
- Modify the base model based on the determined club design parameters determined based on the measured dynamic aspects of a golf swing.

22. The system of claim 21, wherein the base model comprises at a model of at least one of a driver model, fairway wood model; hybrid model; iron model; wedge model; and putter model.

23. The system of claim 21, wherein the computer modeler is configured to modify the base model by changing at least one of:
- Hosel offset;
- Club head volume;
- Club face height;
- Club face length;
- Placement of visual alignment aids;
- Club head Sole curvature;
- Club head sole bounce; and
- Club head sole grid of the base model.

24. The system of claim 16, wherein the manufactured ideal golf club head comprises a metal unibody golf club head having no welds at least a partially hollow section or area.

25. The system of claim 24, wherein the manufactured ideal golf club head comprises hollow golf club head.

26. The system of claim 16, wherein the manufactured ideal golf club head comprises a hollow golf club head having a supporting lattice formed within the hollow golf club head.

27. The system of claim 16, wherein the manufactured golf club head comprises a hollow portion having at least one internal rib formed therein.

28. The system of claim 16, wherein the manufactured golf club head comprises an engineered texture or design formed in at least one surface thereof.

29. The system of claim 16, wherein the manufactured golf club head comprises at least one attachment feature.

30. The system of claim 29, wherein the at least one attachment feature is selected from at least one of:
- a clip;
- a snap;
- a pocket;
- a threaded surface; and
- a slot.

31. A method of manufacturing a custom golf club, the method comprising:
- measuring, using a launch monitor, dynamic launch aspects of a golf swing, and flight characteristics imparted to a golf ball thereby, of a user when the user swings a regular golf club;
- determine club design parameters based on the measured dynamic launch aspects and flight characteristics as a result of the user's golf swing;
- generating a computer model representing a portion of a custom golf club head based on the determined design parameters, wherein the generating the computer model comprises generating an at least partial hollow portion of a golf club head having an supporting lattice based on the determined design parameters;
- manufacturing the portion of the custom golf club head based on the generated computer model using additive layer manufacturing processes using powder material and a high energy beam to form the supporting lattice as one piece concurrently with forming an external surface of the at least partial hollow portion around the supporting lattice;
- attaching the portion of the custom golf club head to a preformed partial club head to assemble the custom golf club head.

32. The method of claim 31, wherein the manufactured portion of the custom golf club head is at least one of:
- A crown plate;
- A sole plate;
- A hitting face plate;
- A cup face (wrapped face section); and
- A hosel.

33. The method of claim 31, wherein the preformed partial club head is formed using at least one of:
- a stamping process;
- a casting process; and
- a forging process.

34. The method of claim 31, wherein the manufactured portion is attached to the preformed partial club head by at least one of:
- a welding process;
- a bonding process;
- a brazing process; and
- a screw attachment process.

35. The method of claim 31, wherein the measured dynamic aspects of a golf swing include one or more of: golf club head swing speed, golf ball launch spin rate, golf ball launch angle, backspin, attack angle, ball speed, swing plane angles, club path, spin axis, horizontal launch angle, tempo, dynamic loft, droop of the club shaft, lead of the club shaft, lag of the club shaft, and face angle.

* * * * *